US011915854B2

(12) United States Patent
Ishida et al.

(10) Patent No.: US 11,915,854 B2
(45) Date of Patent: Feb. 27, 2024

(54) WIRE COIL COMPONENT AND METHOD FOR PRODUCING WIRE COIL COMPONENT

(71) Applicant: Murata Manufacturing Co., Ltd., Kyoto-fu (JP)

(72) Inventors: Yuya Ishida, Nagaokakyo (JP); Katsuyuki Takahashi, Nagaokakyo (JP); Hiroyuki Sugie, Nagaokakyo (JP); Keijiro Kojima, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 803 days.

(21) Appl. No.: 16/291,979

(22) Filed: Mar. 4, 2019

(65) Prior Publication Data

US 2019/0287712 A1 Sep. 19, 2019

(30) Foreign Application Priority Data

Mar. 13, 2018 (JP) ................................ 2018-045695

(51) Int. Cl.

*H01F 27/29* (2006.01)
*H01F 1/14* (2006.01)
*H01F 1/28* (2006.01)
*H01F 17/04* (2006.01)
*H01F 27/28* (2006.01)
*H01F 41/077* (2016.01)

(52) U.S. Cl.

CPC ......... *H01F 27/2828* (2013.01); *H01F 1/143* (2013.01); *H01F 1/28* (2013.01); *H01F 17/045* (2013.01); *H01F 27/2804* (2013.01); *H01F 27/29* (2013.01); *H01F 27/292* (2013.01); *H01F 41/077* (2016.01); *H01F 2017/048* (2013.01)

(58) Field of Classification Search

CPC ........................ H02F 27/2828; H01F 27/2828
USPC ........................................................ 336/192
See application file for complete search history.

(56) References Cited

U.S. PATENT DOCUMENTS 7,898,375 B2 * 3/2011 Kitajima .............. H01F 17/045 336/83
2011/0006870 A1 * 1/2011 Sakamoto ............ H01F 17/045 336/221
2013/0328656 A1 12/2013 Sakamoto
2015/0022309 A1 1/2015 Marusawa (Continued)

FOREIGN PATENT DOCUMENTS

CN 101790766 A 7/2010
CN 102800456 A * 11/2012

(Continued)

OTHER PUBLICATIONS

English translation of CN102800456A (Year: 2012).*

(Continued)

*Primary Examiner* — Ronald Hinson
(74) *Attorney, Agent, or Firm* — Studebaker & Brackett PC

(57) ABSTRACT

A wire coil component includes a shaped article, a wire wound around the shaped article, and terminal electrodes to which the ends of the wire are connected. The shaped article is formed from a magnetic resin containing a binder resin and a magnetic metal powder and has a thermal expansion coefficient of about 12 ppm/K or more and about 16 ppm/K or less (i.e., from about 12 ppm/K to about 16 ppm/K) from −55° C. to 150° C.

17 Claims, 3 Drawing Sheets

(56) References Cited

U.S. PATENT DOCUMENTS

| | | | | |
|---|---|---|---|---|
| 2017/0278618 | A1* | 9/2017 | Matsui | H01F 27/29 |
| 2017/0294260 | A1 | 10/2017 | Ishida | |
| 2017/0297096 | A1* | 10/2017 | Harano | H01F 27/255 |
| 2018/0061562 | A1* | 3/2018 | Kanbe | H01F 27/402 |
| 2019/0172623 | A1* | 6/2019 | Ito | H01F 27/24 |

FOREIGN PATENT DOCUMENTS

| | | | |
|---|---|---|---|
| CN | 104284941 | A | 1/2015 |
| CN | 107275057 | A | 10/2017 |
| JP | H04-284609 | A | 10/1992 |
| JP | 2010-187006 | A | 8/2010 |
| JP | 2013-254911 | A | 12/2013 |
| JP | 2014-082382 | A | 5/2014 |
| WO | 2009/028247 | A1 | 3/2009 |
| WO | 2013/161494 | A1 | 10/2013 |

OTHER PUBLICATIONS

English translation of JP08138948 (Year: 1994).*

An Office Action; "Notice of Reasons for Refusal," mailed by the Japanese Patent Office dated Aug. 4, 2020, which corresponds to Japanese Patent Application No. 2018-045695 and is related to U.S. Appl. No. 16/291,979 with English language translation.

* cited by examiner

WIRE COIL COMPONENT AND METHOD FOR PRODUCING WIRE COIL COMPONENT

CROSS-REFERENCE TO RELATED APPLICATION

This application claims benefit of priority to Japanese Patent Application No. 2018-045695, filed Mar. 13, 2018, the entire content of which is incorporated herein by reference.

BACKGROUND

Technical Field

The present disclosure relates to a wire coil component and a method for producing a wire coil component.

Background Art

A known type of wire coil components have a sintered core, for example of ferrite or alumina, for a wire to be wound around. On the core are formed terminal electrodes, which are soldered to connection electrodes of a mount board, i.e., a board onto which the coil component is mounted. As an alternative to a sintered core, another type of wire coil components utilize a magnetic resin body, composed of a magnetic powder and a binder resin, with the wire molded therein, as described, for example, in Japanese Unexamined Patent Application Publication Nos. 4-284609 and 2014-82382.

SUMMARY

The mount board, however, is a resin board and therefore expands and shrinks greatly according to the ambient temperature compared with a wire coil component having a sintered core. The difference in volume changes between the core and mount board causes stress between the mount board and wire coil component and inside the coil component, and these stresses may result in cracks, for example in the solder and between the core and terminal electrodes. Such cracks can impair the reliability of the wire coil component by affecting the coil component characteristics and/or causing poor mounting on the mount board.

With a wire coil component having a magnetic resin body as in the aforementioned patent documents, the difference in volume changes from the mount board would be smaller than with one having a sintered core. This wire-molded configuration, however, may cause the coating on the wire to be damaged by the magnetic resin when the body is compressed or heated during its formation. Damage to the coating on the wire can cause the coil component to decline in reliability over time even if it meets the initial characteristics requirements. The inventors have also found that when the binder in the magnetic resin is a polysiloxane as in a configuration described in the latter patent document, the coil component can be somewhat unreliable. When such a wire coil component was subjected to a heat impact test from −55° C. to 150° C., cracks developed in the solder and inside the coil component because of a difference in thermal expansion coefficient between the resin body and the mount board.

Accordingly, the present disclosure limits such degradations in the reliability of a wire coil component.

According to one embodiment of the present disclosure, a wire coil component includes a shaped article, a wire wound around the shaped article, and terminal electrodes to which the ends of the wire are connected. The shaped article is formed from a magnetic resin containing a binder resin and a magnetic metal powder and has a thermal expansion coefficient of about 12 ppm/K or more and about 16 ppm/K or less (i.e., from about 12 ppm/K to about 16 ppm/K) from −55° C. to 150° C. This configuration limits the reliability degradations by virtue of the thermal expansion coefficient of the shaped article being close to that of the mount board onto which the wire coil component will be mounted.

Preferably, the binder resin is an epoxy-containing resin. This configuration limits the reliability degradations more efficiently.

Preferably, the percentage by weight of the binder resin in the shaped article is about 1 wt % or more and about 4 wt % or less (i.e., from about 1 wt % to about 4 wt %). This configuration helps give the shaped article a thermal expansion coefficient of about 12 ppm/K or more and about 16 ppm/K or less (i.e., from about 12 ppm/K to about 16 ppm/K).

Preferably, the wire coil component includes a coating resin that seals the portion of the wire wound around the shaped article. This configuration provides protection of the wire.

Preferably, the coating resin has a thermal expansion coefficient of about 12 ppm/K or more and about 16 ppm/K or less (i.e., from about 12 ppm/K to about 16 ppm/K) from −55° C. to 150° C. This configuration reduces the occurrence of cracks in the coating resin.

Preferably, the coating resin is made of the same material as the magnetic resin. This configuration makes it easier to fabricate the wire coil component.

Preferably, the shaped article has a spindle section, around which the wire is wound, and a pair of flanges at the ends of the spindle section. When, in a cross-section of the shaped article and the coating resin extending along the axis of the spindle section, a first region is defined as the region enclosed by the line that connects the ends of the flanges and by the surface of the shaped article, and a second region as the region whose perimeter includes the line and the surface of the coating resin, the percentage by area of the second region to the first region is equal to or larger than about 5%. This configuration is advantageous in terms of stress to the wire sealed with the coating resin and reduces the risk of the wire breaking.

Preferably, the terminal electrodes are on one of the pair of flanges. This configuration helps increase the number of windings of the wire.

Preferably, the wire coil component has an oxide coating covering at least part of the surface of the shaped article, and the terminal electrodes include an oxygen-compatible metal layer as a base layer formed on the surface of the oxide coating. This configuration provides firmer fastening of the wire coil component to a mount board owing to strong adhesion between the shaped article and oxide coating and between the base layer of the terminal electrodes and the oxide coating of the shaped article.

According to another embodiment of the present disclosure, a method for producing a wire coil component includes forming a shaped article having a thermal expansion coefficient of about 12 ppm/K or more and about 16 ppm/K or less (i.e., from about 12 ppm/K to about 16 ppm/K) from −55° C. to 150° C. using a granulated powder resulting from mixing a binder resin and a magnetic metal powder. This configuration limits the reliability degradations by virtue of the thermal expansion coefficient of the shaped article being close to that of the mount board onto which the wire coil component will be mounted.

Preferably, the percentage by weight of the binder resin in the shaped article is set to about 1 wt % or more and about 4 wt % or less (i.e., from about 1 wt % to about 4 wt %). This configuration helps give the shaped article a thermal expansion coefficient of about 12 ppm/K or more and about 16 ppm/K or less (i.e., from about 12 ppm/K to about 16 ppm/K).

Other features, elements, characteristics and advantages of the present disclosure will become more apparent from the following detailed description with reference to the attached drawings.

DETAILED DESCRIPTION

The following describes embodiments. In the accompanying drawings, structural elements may be enlarged to help understanding. The relative dimensions of structural elements are not necessarily to scale and may be different from drawing to drawing. In the cross-sectional diagrams, structural elements are hatched to help understanding, although this may not be the case for all elements.

Embodiment 1

The following describes Embodiment 1.

Figure 1:
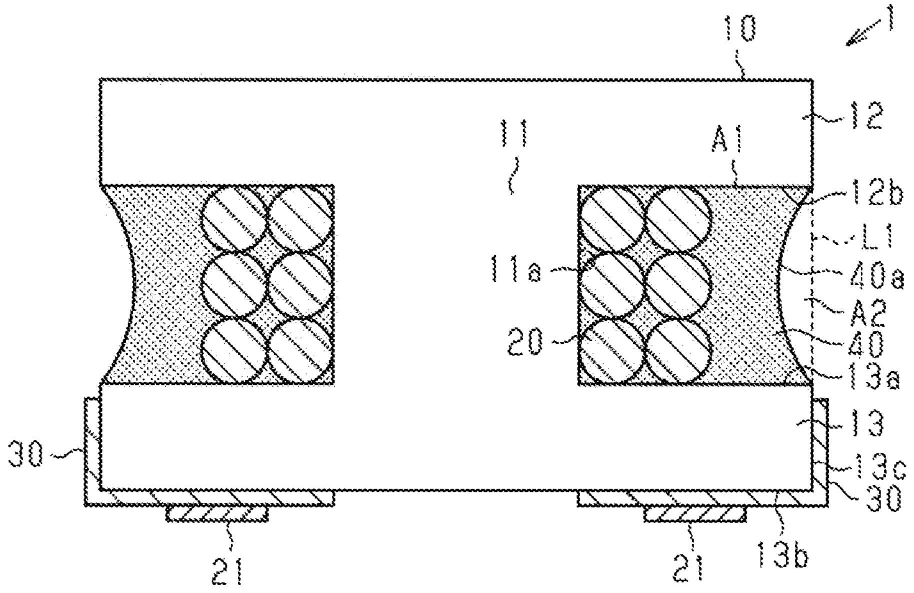
FIG. 1 is a schematic cross-section of a wire coil component according to Embodiment 1.

The wire coil component 1 illustrated in FIG. 1 includes a core 10 as the shaped article, a wire 20 wound around the core 10, two terminal electrodes 30 connected to the wire 20, and a coating resin 40 sealing the wire 20 wound around the core 10.

The core 10 has a spindle section 11 extending in a predetermined direction (vertical direction in FIG. 1) and flanges 12, 13 at the ends of the spindle section 11. The surface of the core 10 has a ground portion produced by a predetermined treatment, such as cutting with a dicing machine or barrel finishing, during the formation of the core 10. As mentioned herein, the vertical direction is the direction of extension of the spindle section 11, and terms like "top" and "bottom," "upper" and "lower," etc., are based on this direction. The flange 13 is on the lower (bottom) side, whereas the flange 12 is on the upper (top) side.

The core 10 is formed from, for example, a magnetic resin that contains a resin and a magnetic metal powder. More specifically, the core 10 is a shaped article formed from a magnetic resin that contains a binder resin and a magnetic metal powder. This means that the core 10 is not a sintered body, for example of ferrite or alumina. The binder resin is preferably an epoxy-containing resin, more preferably epoxy resin. Examples of epoxy-containing resins that can be used include bisphenol-A epoxy resins, bisphenol-F epoxy resins, epoxy polysiloxanes, alicyclic epoxy resins, and tetrafunctional naphthalene-based epoxy resins. Thermosetting resins can also be used, including phenolic resins and silicones, or even a mixture of two or more resins can be used. When a curing agent is used to cure the binder resin, the curing agent can be, for example, a phenolic resin, a polyamine, imidazole, or an acid anhydride.

The magnetic metal powder can be, for example, a powder of pure iron (Fe) or an Fe alloy. Examples of Fe alloys include FeNi, FeCo, FeSi, FeSiCr, FeSiAl, FeSiBCr, and FePCSiBNbC. One of such powders can be used alone, or a combination of two or more can be used. The pure-iron powder may be a powder of carbonyl iron, which is obtained by, for example, thermally decomposing pentacarbonyl iron. Preferably, the surface of the magnetic metal powder has been electrically insulated.

In this embodiment, the core 10 is a shaped article having a thermal expansion coefficient of about 12 ppm/K or more and about 16 ppm/K or less (i.e., from about 12 ppm/K to about 16 ppm/K), for example about 14 ppm/K, from −55° C. to 150° C. It is preferred that the percentage by weight of epoxy resin based on the total weight of the core 10 (hereinafter referred to as the resin content) be about 1 wt % or more and about 4 wt % or less (i.e., from about 1 wt % to about 4 wt %). Such a resin content results in a thermal expansion coefficient of the core 10 falling within the above range.

The two terminal electrodes 30 are on the surface of the lower flange 13 of the core 10. This helps increase the number of windings of the wire 20. Each terminal electrode 30 is composed of an electrode on the bottom 13*b* of the flange 13 and an electrode on the side 13*c* of the flange 13 joined together at the corner between the bottom 13*b* and side 13*c*, although the terminal electrodes 30 only need to be present on the bottom 13*b* of the flange 13. To the terminal electrodes 30, the ends 21 of the wire 20 are connected.

The terminal electrodes 30 are electrically conductive films, preferably containing, for example, at least one of chromium (Cr), titanium (Ti), and vanadium (V). The terminal electrodes 30 do not need to be metal layers made of the simple form of these metals and may contain an alloy of these metals, such as nickel (Ni)—Ti, Ni—V, or Ni—Cr. The terminal electrodes 30 are formed by, for example, sputtering. The terminal electrodes 30 may be plated, for example by electrolytic plating. Examples of plating metals that can be used include Ni, copper (Cu), silver (Ag), tin (Sn), and alloys such as Ni—Cr and Ni—Cu. Multilayer plating, which includes multiple metal (plating) layers, can also be used.

The wire 20 is composed of a conductor, such as Cu, in the form of a thread and an insulating coating, such as a resin coating, on the surface of the conductor and is wound around the spindle section 11 of the core 10. The ends 21 of the wire 20 are connected respectively to the terminal electrodes 30, for example by plating or heat bonding. This makes the wire coil component 1 advantageous in characteristics, for example over a multilayer coil component.

Except in the portions leading to the connections to the terminal electrodes 30, the wire 20 is covered by a coating resin 40 placed between the flanges 12, 13 of the core 10. This coating resin 40 protects the wire 20. The coating resin 40 has a thermal expansion coefficient of about 12 ppm/K or more and about 16 ppm/K or less (i.e., from about 12 ppm/K to about 16 ppm/K), for example about 14 ppm/K, from −55° C. to 150° C. A thermal expansion coefficient of the coating resin 40 equal or similar to that of the core 10 will result in reduced occurrence of cracks in the coating resin 40. The coating resin 40 is preferably made of, for example, the same material as the core 10, i.e., preferred materials are the same as the magnetic resins listed as potential materials for the core 10. This makes it easier to fabricate the wire coil component 1. In this embodiment, the magnetic resin is, for example, epoxy resin containing a magnetic metal powder.

As mentioned herein, a thermal expansion coefficient from a certain minimum to a certain maximum (coefficient of linear expansion α) represents an average coefficient of thermal expansion (average coefficient of linear expansion). It is based on the change in the length of the object of interest when the temperature varies from the minimum to the maximum, ΔL, from the length of the object at the minimum temperature (L1) and also based on the change in temperature ΔT and is calculated according to the following equation:

$$\alpha=\Delta L/(L1\cdot\Delta T).$$

The coating resin 40 covers the wire 20 wound around the spindle section 11 of the core 10. Preferably, the surface of the coating resin 40 is closer than the ends of the flanges 12, 13 to the spindle section 11. FIG. 1 illustrates a cross-section of the core 10 extending along the axis of its spindle section 11. In this cross-section, a first region A1 is defined as the region enclosed by the line L1 that connects the ends of the flanges 12, 13 and by the surface of the core 10 (surface 11*a* of the spindle section 11, bottom 12*b* of the flange 12, and top 13*a* of the flange 13), and a second region A2 as the region whose perimeter includes the line L1 and the surface 40*a* of the coating resin 40. Based on this, the above preferred arrangement can be described as the percentage by area of the second region A2 to the first region A1 being equal to or larger than about 5%. Such a coating resin 40 is advantageous in terms of stress to the sealed wire 20 and reduces the risk of the wire 20 breaking.

Such a wire coil component 1 is obtained by wiring a wire 20 wound around a core 10 formed from a magnetic resin that contains a magnetic metal powder and a binder resin. Specifically, a magnetic metal powder is mixed with a binder that is any of the resins listed above into a granulated powder, and this granulated powder is molded. The molded mixture is cured by heating at a predetermined temperature to give a shaped material. Alternatively, the granulated powder may be shaped by injection molding. The resulting shaped material is ground to give a core 10 having the aforementioned spindle section 11 and flanges 12, 13 as the shaped article. Terminal electrodes 30 are then formed on the core 10, a wire 20 is wound around the spindle section 11, and the ends 21 of the wire 20 are joined to the terminal electrodes 30 and immobilized by solder dipping. Alternatively, the ends 21 of the wire 20 may be heat-bonded to plating formed on the terminal electrodes 30.

A coating resin 40 is then applied to fill the space between the flanges 12, 13 of the core 10, sealing the portion of the wire 20 wound around the spindle section 11 of the core 10. This completes the wire coil component 1.

Operation(s)

Figure 2:
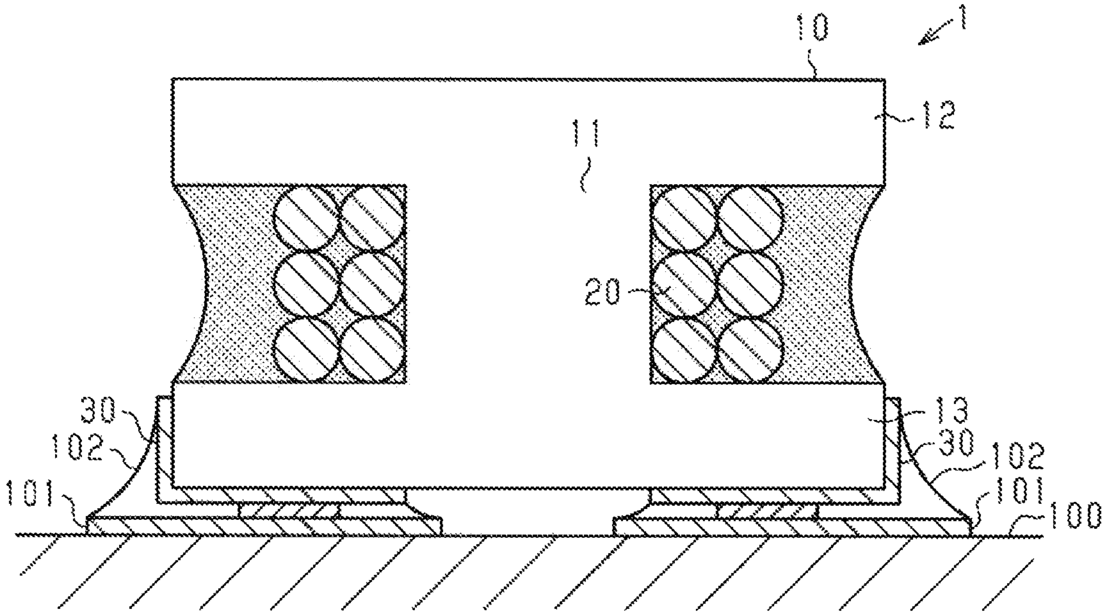
FIG. 2 is a schematic cross-section of the wire coil component in the mounted state.

FIG. 2 illustrates a wire coil component 1 according to this embodiment in the mounted state.

The wire coil component 1 is mounted onto a mount board 100. The terminal electrodes 30 of the wire coil component 1 are connected to connection electrodes 101 of the mount board 100 with solder 102 for mounting (mount solder). An exemplary application of a wire coil component 1 according to this embodiment and a mount board 100 with the wire coil component 1 thereon is use in in-car equipment. In such applications, the mount board 100 is usually an FR-4 (Flame Retardant Type 4) glass-epoxy board, and this type of mount board 100 has a thermal expansion coefficient of about 14 ppm/K from −55° C. to 150° C.

The wire coil component 1 includes a shaped article 10 (a core 10), a wire 20 wound around the shaped article 10, and terminal electrodes 30 to which the ends 21 of the wire 20 are connected. The shaped article 10 is formed from a magnetic resin containing a binder resin and a magnetic metal powder and has a thermal expansion coefficient of about 12 ppm/K or more and about 16 ppm/K or less (i.e., from about 12 ppm/K to about 16 ppm/K) from −55° C. to 150° C. This configuration limits the reliability degradations by virtue of the thermal expansion coefficient of the core 10 being close to that of the mount board 100.

Preferably, the binder resin as a component of the core 10 is an epoxy-containing resin. This limits the reliability degradations more efficiently.

Preferably, the percentage by weight of the binder resin in the core 10 is about 1 wt % or more and about 4 wt % or less (i.e., from about 1 wt % to about 4 wt %). This helps give the core 10 a thermal expansion coefficient of about 12 ppm/K or more and about 16 ppm/K or less (i.e., from about 12 ppm/K to about 16 ppm/K).

The wire coil component 1 has a coating resin 40 that seals the portion of the wire 20 wound around a spindle section 11 of the core 10. This coating resin 40 protects the wire 20.

In a cross-section of the core 10 extending along the axis of its spindle section 11, a first region A1 is defined as the region enclosed by the line L1 that connects the ends of a pair of flanges 12, 13 and by the surface of the core 10 (surface 11*a* of the spindle section 11, bottom 12*b* of the flange 12, and top 13*a* of the flange 13), and a second region A2 as the region whose perimeter includes the line L1 and the surface 40*a* of the coating resin 40. Preferably, the percentage by area of the second region A2 to the first region A1 is equal to or larger than about 5%. Such a coating resin 40 is effective in relaxing stress to the wire 20 and reduces the risk of the wire 20 breaking.

EXAMPLES

The following describes advantages of the above embodiment in further detail by providing examples and comparative examples.

Example 1

In this example, the core 10 was a shaped article formed from a magnetic resin containing a magnetic metal powder and a bisphenol-A epoxy resin as the binder resin. Specifically, a magnetic metal powder was mixed with the binder epoxy resin into a granulated powder, and this granulated powder was molded. The molded mixture was cured by heating at a predetermined temperature to give a shaped material with an epoxy resin content of about 1 wt % based on its total weight. The resulting shaped material was ground to give a core 10 as the shaped article, and terminal electrodes 30 were formed on the core 10. A wire 20 was then wound around the core 10, and the ends 21 of the wire 20 were joined to the terminal electrodes 30 and immobilized by solder dipping, completing wire coil components 1 in the wire-winding structure, a structure based on a wire wound around a core. It should be noted that the wire 20 was bare because these coil components of Example 1 were made without the coating resin 40.

Example 2

The core 10 was a shaped article formed from a magnetic resin containing a magnetic metal powder and a bisphenol-A epoxy resin as the binder resin, with the resin content being about 1.5 wt %. As in Example 1, the wire coil components 1 were constructed in a wire-winding structure without a coating.

Example 3

The core 10 was a shaped article formed from a magnetic resin containing a magnetic metal powder and a bisphenol-A epoxy resin as the binder resin, with the resin content being about 4 wt %. As in Example 1, the wire coil components 1 were constructed in a wire-winding structure without a coating.

Example 4

The core 10 was a shaped article formed from a magnetic resin containing a magnetic metal powder and an epoxy polysiloxane as the binder resin, with the resin content being about 1 wt %. As in Example 1, the wire coil components 1 were constructed in a wire-winding structure without a coating.

Example 5

The core 10 was a shaped article formed from a magnetic resin containing a magnetic metal powder and an alicyclic epoxy resin as the binder resin, with the resin content being about 1 wt %. As in Example 1, the wire coil components 1 were constructed in a wire-winding structure without a coating.

Example 6

The core 10 was a shaped article formed from a magnetic resin containing a magnetic metal powder and a tetrafunctional naphthalene-based epoxy resin as the binder resin, with the resin content being about 1 wt %. As in Example 1, the wire coil components 1 were constructed in a wire-winding structure without a coating.

Example 7

The core 10 was a shaped article formed from a magnetic resin containing a magnetic metal powder and a bisphenol-A epoxy resin as the binder resin, with the resin content being about 1 wt %. The wire coil components 1 were constructed in a wire-winding structure as in Example 1, but the portion of the wire 20 wound around the core 10 was sealed with a coating resin 40.

Comparative Example 1

The core 10 was a shaped article formed from a magnetic resin containing a magnetic metal powder and a polysiloxane as the binder resin, with the resin content being about 1.5 wt %. As in Example 1, the wire coil components 1 were constructed in a wire-winding structure without a coating.

Comparative Example 2

The core 10 was a shaped article formed from a magnetic resin containing a magnetic metal powder and a bisphenol-A epoxy resin as the binder resin, with the resin content being about 6 wt %. As in Example 1, the wire coil components 1 were constructed in a wire-winding structure without a coating.

Comparative Example 3

Molded coil components were fabricated using a shaped article formed from a magnetic resin containing a magnetic metal powder and a bisphenol-A epoxy resin as the binder resin, with the resin content being about 4 wt %. These molded coil components were in the wire-molded structure, which is described below.

Figure 3:
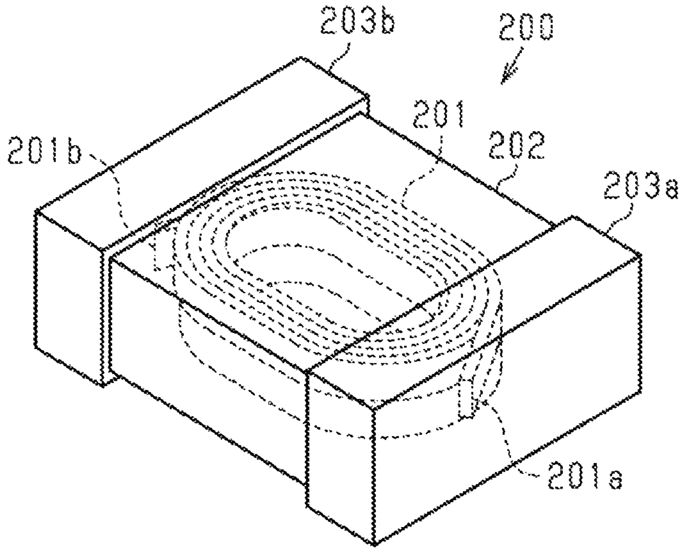
FIG. 3 is a schematic perspective view of a wire coil component according to a comparative example.

FIG. 3 is a schematic perspective diagram illustrating an exemplary structure of a molded coil component, which was fabricated in Comparative Example 3. The molded coil component 200 has a structure in which a wire 201 is molded in a body 202 that is a substantially cuboid shaped article formed from a magnetic resin containing a binder resin and a magnetic metal powder, and the ends 201*a*, 201*b* of the wire 201 are electrically coupled to terminal electrodes 203*a*, 203*b* formed at the respective ends of the body 202. The terminal electrodes 203*a*, 203*b*, for example metal conductors in the shape of caps, are fitted over the respective ends of the body 202 and fastened to the body 202 and connected to the ends 201*a*, 201*b* of the wire 201, for example with an electrically conductive adhesive.

Quality Check

The wire coil components 1 of Examples 1 to 7 and Comparative Examples 1 to 3 were mounted onto a mount board 100 as illustrated in FIG. 2, and their inductance and Q factor were measured using a predetermined measuring instrument (LCR meter) before and after a heat impact test. The measurements were taken on 77 wire coil components 1 for each example or comparative example, and components with a low Q (30% or greater decrease from baseline) were counted. X-ray (CT) imaging was also performed to check the number of components with a crack in solder and a crack inside.

Measuring the Thermal Expansion Coefficient

For the core 10 of Examples 1 to 7 and Comparative Examples 1 and 2 and the body 202 of Comparative Example 3, samples were prepared as substantially cubic articles having dimensions of about 3 mm×3 mm×3 mm Their thermal expansion coefficient was measured using Bruker TMA 4000S under the following conditions: load, 10 gf; $N_2$ atmosphere (200 ml/min); temperature profile, −55° C. to 150° C. (5° C./min). The average coefficient of thermal expansion was determined at 150° C. based on −55° C.

Table 1 is a summary of the binder, resin content, measured thermal expansion coefficient, wire structure, coating resin use, and data from the quality check (number of coil components with a crack in solder, a crack inside, and a low Q and overall result) for Examples 1 to 7 and Comparative Examples 1 to 3.

TABLE 1

| No. | Binder | Resin content (wt %) | Thermal expansion coefficient (ppm/K) | Wire structure | Coating resin | Crack in solder | Crack inside | Low Q | Result |
|---|---|---|---|---|---|---|---|---|---|
| Example 1 | Bisphenol-A epoxy resin | 1 | 14.1 | Winding | No | 0/77 | 0/77 | 0/77 | G |
| Example 2 | Bisphenol-A epoxy resin | 1.5 | 14.4 | Winding | No | 0/77 | 0/77 | 0/77 | G |
| Example 3 | Bisphenol-A epoxy resin | 4 | 16.0 | Winding | No | 0/77 | 0/77 | 0/77 | G |
| Example 4 | Epoxy polysiloxane | 1 | 12.0 | Winding | No | 0/77 | 0/77 | 0/77 | G |
| Example 5 | Alicyclic epoxy resin | 1 | 14.0 | Winding | No | 0/77 | 0/77 | 0/77 | G |
| Example 6 | Tetrafunctional naphthalene-based epoxy resin | 1 | 14.0 | Winding | No | 0/77 | 0/77 | 0/77 | G |
| Example 7 | Bisphenol-A epoxy resin | 1 | 14.1 | Winding | Yes | 0/77 | 0/77 | 0/77 | G |
| Comparative Example 1 | Polysiloxane | 1.5 | 11.1 | Winding | No | 21/77 | 0/77 | 0/77 | NG |
| Comparative Example 2 | Bisphenol-A epoxy resin | 6 | 18.0 | Winding | No | 23/77 | 0/77 | 0/77 | NG |
| Comparative Example 3 | Bisphenol-A epoxy resin | 4 | 14.7 | Molded | No | 0/77 | 5/77 | 10/77 | NG |

Results

As shown in Table 1, in Comparative Examples 1 and 2, the thermal expansion coefficient of the core 10 was 11.1 (ppm/K) and 18.0 (ppm/K), respectively. In these comparative examples, the mount solder 102 cracked, resulting in open defects between the mount board 100 and a wire coil component 1. This was presumably due to the difference between the thermal expansion coefficient of the core 10 and that of the mount board 100.

In Comparative Example 3, low Q occurred as a result of shorting, presumably because the magnetic metal powder in the body 202 damaged the coating on the wire 201 during the shaping of the body 202, and the heat impact test caused the flaw to grow. In this comparative example the inside of the body 202 also cracked, presumably because of stress to the wire 201 resulting from shaping.

By contrast, in Examples 1 to 7, in which a core 10 (shaped article) having a thermal expansion coefficient of about 12 (ppm/K) or more and about 16 (ppm/K) or less (i.e., from about 12 ppm/K to about 16 ppm/K) was used, no coil component 1 had a crack in solder, a crack inside, or a low Q.

Overall, this embodiment provides the following advantages.

(1-1) A wire coil component 1 includes a core (shaped article) 10, a wire 20 wound around the core 10, and terminal electrodes 30 to which the ends 21 of the wire 20 are connected. The core 10 is formed from a magnetic resin containing a binder resin and a magnetic metal powder and has a thermal expansion coefficient of about 12 ppm/K or more and about 16 ppm/K or less (i.e., from about 12 ppm/K to about 16 ppm/K) from −55° C. to 150° C. By virtue of the thermal expansion coefficient of the core 10 being close to that of a mount board 100, the reliability degradations are limited.

(1-2) Preferably, the binder resin as a component of the core 10 is an epoxy-containing resin. This limits the reliability degradations.

(1-3) Preferably, the resin content of the core 10 is about 1 wt % or more and about 4 wt % or less (i.e., from about 1 wt % to about 4 wt %). This helps give the core 10 a thermal expansion coefficient of about 12 ppm/K or more and about 16 ppm/K or less (i.e., from about 12 ppm/K to about 16 ppm/K).

(1-4) The wire coil component 1 has a coating resin 40 that seals the portion of the wire 20 wound around a spindle section 11 of the core 10. This coating resin 40 protects the wire 20.

(1-5) In a cross-section of the core 10 extending along the axis of its spindle section 11, a first region A1 is defined as the region enclosed by the line L1 that connects the ends of a pair of flanges 12, 13 and by the surface of the core 10 (surface 11*a* of the spindle section 11, bottom 12*b* of the flange 12, and top 13*a* of the flange 13), and a second region A2 as the region whose perimeter includes the line L1 and the surface 40*a* of the coating resin 40. The percentage by area of the second region A2 to the first region A1 is equal to or larger than about 5%. Such a coating resin 40 is advantageous in terms of stress to the sealed wire 20 and reduces the risk of the wire 20 breaking.

Embodiment 2

The following describes Embodiment 2.

Figure 4:
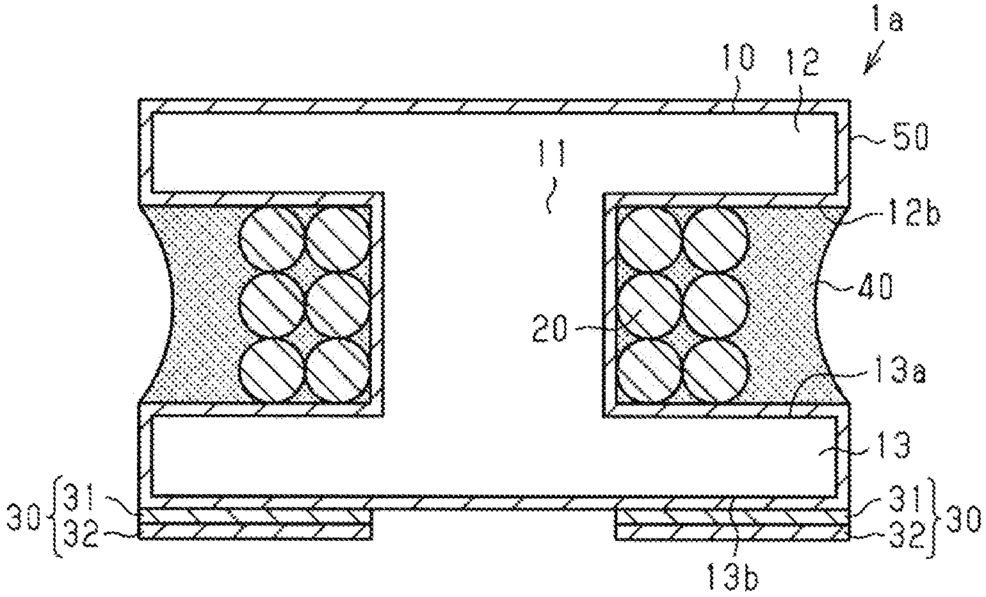
FIG. 4 is a schematic cross-section of a wire coil component according to Embodiment 2.

In this embodiment, structural members described in Embodiment 1 are referenced by the same numerals as in Embodiment 1, and their description may be omitted partially or completely. The wire coil component 1*a* illustrated in FIG. 4 has an oxide coating 50 besides the structure of the wire coil component 1, described in Embodiment 1.

The oxide coating 50 in this embodiment covers the entire surface of the core 10. The oxide coating 50, however, does not need to cover the entire surface of the core 10 and only needs to cover at least part of the surface of the core 10. For example, the oxide coating 50 may be formed to cover the surface of the spindle section 11, around which the wire 20 is wound, of the core 10, the surfaces of the flanges 12, 13 facing inward and touching the wire 20 (bottom 12*b* of the flange 12 and top 13*a* of the flange 13), and the ends of the flange 13 to be interposed between the wire 20 and core 10. An oxide coating 50 covering the entire surface of the core

10 can be formed efficiently because such an oxide coating 50 requires no patterning or masking to form.

The oxide coating 50 lies at least between terminal electrodes 30 (detailed hereinafter) and the core 10. It is particularly preferred that the oxide coating 50 cover the entire bottom 13*b* of the flange 13, the surface on which the terminal electrodes 30 are formed.

The oxide coating 50 is a coating containing a metal oxide. The metal oxide is, for example, titanium oxide (TiO), silicon oxide (SiO), aluminum oxide (AlO), or zirconium oxide (ZrO). For improved efficiency in mass production, it is preferred that the oxide coating 50 contain a titanium oxide or a silicate in particular. These metal oxides are preferred in terms of strength and specific resistance. In this embodiment, the oxide coating 50 contains such a metal oxide (TiO, SiO, AlO, or ZrO) with an organic chain bonded thereto, such as a titanium alkoxide or silicon alkoxide. Specific examples include titanium alkoxides, titanium acylates, and titanium chelates. The organic chain preferably has any of the epoxy, amino, isocyanurate, imidazole, vinyl, mercapto, phenolic, and methacryloyl groups. The oxide coating 50 can be formed using, for example, the sol-gel method. To give the oxide coating 50 a structure in which an organic chain is bonded to a metal oxide (organic-inorganic hybrid structure), an example of a process is to mix a sol-gel coating solution containing a metal alkoxide with a silane coupling agent containing an organic chain, apply the mixture to the surface of the core 10, heat the coating to induce dehydration bonding, and dry the coating at a predetermined temperature.

There are two terminal electrodes 30 on the bottom of the core 10, i.e., on the (down-facing) surface of the oxide coating 50. The terminal electrodes 30 include a base layer 31 on the surface of the oxide coating 50 and a plating layer 32 covering the surface of the base layer 31. The base layer 31 and plating layer 32 are on the down-facing surface of the oxide coating 50 in this order.

The base layer 31 is a metal layer highly compatible with oxygen. The base layer 31 therefore interacts strongly with the oxygen in the oxide coating 50, forming covalent bonds for example. As a result, the adhesion between the terminal electrodes 30 and core 10 (oxide coating 50) is improved.

The base layer 31 preferably contains, for example, at least one of chromium (Cr), titanium (Ti), vanadium (V), scandium (Sc), manganese (Mn), yttrium (Y), zirconium (Zr), niobium (Nb), molybdenum (Mo), technetium (Tc), hafnium (Hf), tantalum (Ta), tungsten (W), and rhenium (Re). This improves the adhesion of the base layer 31 to the oxide coating 50. It is particularly preferred that the base layer 31 contain any of Cr, Ti, and V. This improves the adhesion between the base layer 31 and oxide coating 50 better than with other metals. The base layer 31 does not need to be a metal layer made of the simple form of these metals and may contain an alloy of these metals, such as Ni-TI, Ni—V, or Ni—Cr. The base layer 31 can be formed by, for example, sputtering. Other known techniques for forming a metal layer can also be used, including vapor deposition, atomic layer deposition, and plating.

The plating layer 32 can be made using, for example, a metal, such as nickel (Ni), copper (Cu), silver (Ag), or tin (Sn) or an alloy, such as Ni-chromium (Cr) or Ni—Cu. The plating layer 32 is formed by, for example, electrolytic plating. The plating layer 32 may be composed of multiple metal (plating) layers.

Operation(s)

The wire coil component 1*a* includes a core 10 (shaped article) formed from a magnetic resin containing a binder resin and a magnetic metal powder, an oxide coating 50 covering at least part of the surface (bottom) of the core 10, and terminal electrodes 30. The terminal electrodes 30 include an oxygen-compatible metal layer as a base layer 31 formed on the surface of the oxide coating 50. Owing to strong adhesion between the core 10 and oxide coating 50 and between the base layer 31 of the terminal electrodes 30 and the oxide coating 50 on the core 10, the wire coil component 1*a* is improved in the strength of its fastening to a mount board.

The oxide coating 50 contains a metal oxide with an organic chain bonded thereto. Since the core 10 is formed from a magnetic resin containing a binder resin, an organic chain in the oxide coating 50 interacts strongly with the binder resin in the core 10, forming covalent bonds for example, and thereby improves the adhesion between the oxide coating 50 and core 10. Such an organic chain therefore provides even firmer fastening of the wire coil component 1*a* to a mount board.

A glass coating, for example, used as the insulating film on the core 10 could crack and lose insulating properties when subjected to heat impact. The oxide coating 50 in this embodiment, by contrast, is flexible and unlikely to crack even under heat impact by virtue of the metal oxide with an organic chain bonded thereto it contains.

As mentioned, the core 10 is formed from a magnetic resin containing a binder resin. During its production, the core 10 may be ground, for example by barrel finishing, after shaping. The grinding process exposes particles of the magnetic metal powder on the surface of the core 10. If the insulating coating on the wire 20 has been damaged, the exposed particles of the magnetic metal powder may come into contact with the conductor of the wire 20 at the flaw and affect the insulation resistance (IR) of the wire coil component 1*a*. The core 10 of the wire coil component 1*a*, however, has an oxide coating 50 that covers the entire surface of the core 10. Interposed between the wire 20 and core 10, the oxide coating 50 covers any particle of the magnetic metal powder exposed by grinding on the surface of the core 10, giving the coil component 1*a* a high insulation resistance.

Overall, this embodiment provides the following advantages besides those of Embodiment 1.

(2-1) A wire coil component 1*a* includes a core 10 (shaped article) formed from a magnetic resin containing a binder resin, an oxide coating 50 covering at least part of the surface (bottom) of the core 10, and terminal electrodes 30. The terminal electrodes 30 include an oxygen-compatible metal layer as a base layer 31 formed on the surface of the oxide coating 50. Owing to strong adhesion between the core 10 and oxide coating 50 and between the base layer 31 of the terminal electrodes 30 and the oxide coating 50 on the core 10, the wire coil component 1*a* is improved in the strength of its fastening to a mount board.

(2-2) Preferably, the oxide coating 50 contains a metal oxide with an organic chain bonded thereto. Stated differently, it is preferred that the oxide coating 50 be an organic-inorganic hybrid oxide coating. Since the core 10 is formed from a magnetic resin containing a binder resin, an organic chain in the oxide coating 50 interacts strongly with the binder resin in the core 10, forming covalent bonds for example, and thereby improves the adhesion between the oxide coating 50 and core 10. Such an organic chain therefore provides even firmer fastening of the wire coil component 1*a* to a mount board.

(2-3) Preferably, the oxide coating 50 contains an organic chain. This makes the oxide coating 50 flexible and therefore improves the resistance of the wire coil component 1*a* to heat impact. By virtue of the flexibility of the oxide coating 50, the coil component 1*a* remains firmly fastened to a mount board even under heat impact.

(2-4) Around the core 10 is wound a wire 20, and the oxide coating 50 is preferably interposed between the core 10 and wire 20. Even if particles of the magnetic metal powder are exposed on the surface of the core 10, the oxide coating 50 covers these particles, giving the coil component 1*a* a high insulation resistance.

(2-5) In the oxide coating 50, preferably, the amount of the metal element, for example Si or Ti, in the form with the organic chain bonded thereto is between about 0.5 times and about 1.5 times the amount of the metal element, for example Si or Ti, in the form with no organic chain bonded thereto. The inventors have found that this makes certain the improvement in resistance to heat impact.

It is to be noted that the above embodiments may be implemented in the following forms.

Although the wire coil components 1, 1*a* in the above embodiments have two terminal electrodes 30 on the flange 13, wire coil components in other embodiments may have three or more terminal electrodes or even two or more wound wires.

Moreover, the shape of the structural elements in the above embodiments may be changed if necessary.

Figure 5:
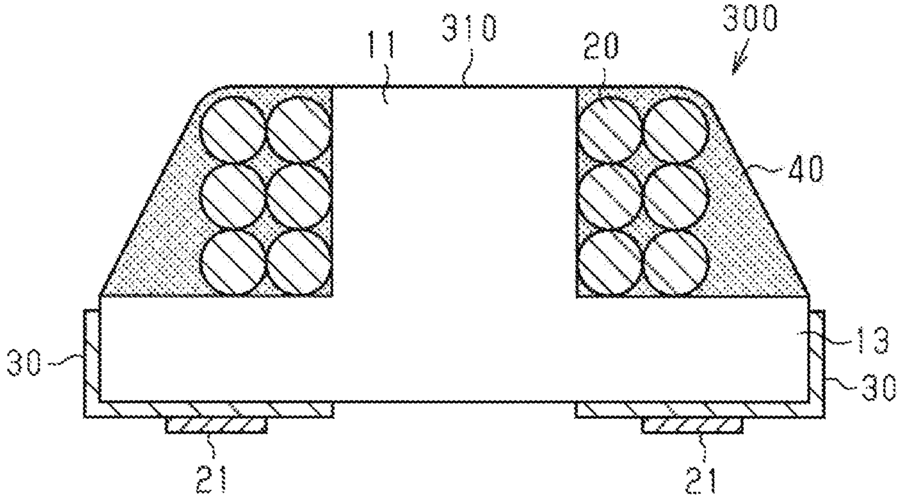
FIG. 5 is a schematic cross-section of a wire coil component according to a variation.

As illustrated in FIG. 5, a wire coil component 300 has a core 310 as the shaped article, a wire 20 wound around the core 310, terminal electrodes 30 to which the ends 21 of the wire 20 are connected, and a coating resin 40 sealing the wire 20. The core 310 has a spindle section 11 wound around with the wire 20 and a flange 13 at one end (lower end in FIG. 5) of the spindle section 11. The structure of this core 310 is given by removing the flange 12 from the core 10 in Embodiment 1. This wire coil component 300 provides the same advantage of reduced occurrence of defects as the wire coil component 1.

Figure 6:
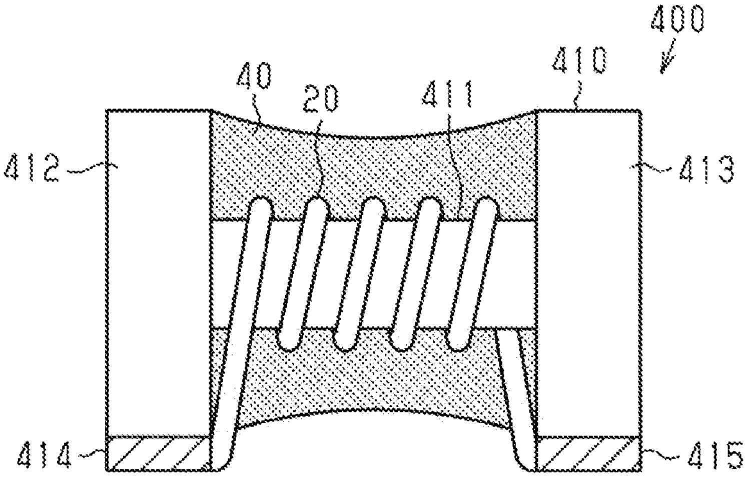
FIG. 6 is a schematic cross-section of a wire coil component according to a variation.

As illustrated in FIG. 6, the core 410 of a wire coil component 400 includes a spindle section 411, around which the wire 20 is wound, and flanges 412, 413 at the ends of the spindle section 411. Terminal electrodes 414, 415 are on the respective flanges 412, 413, and the ends of the wire 20 are connected to the respective terminal electrodes 414, 415. There is also a coating resin 40 sealing the wire 20. This wire coil component 400 is mounted onto a mount board, and the flanges 412, 413 support the spindle section 411 substantially parallel to the mount board. This wire coil component 400 is a so-called horizontal wire coil component and provides the same advantage of limited reliability degradations as Embodiment 1.

The above embodiments and variations may optionally be replaced in part with a known configuration and may optionally be combined with another embodiment or variation partially or completely.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A wire coil component comprising:

a shaped article formed from a magnetic resin that contains a binder resin and a magnetic metal powder and having a thermal expansion coefficient of from 12 ppm/K to 16 ppm/K, from −55° C. to 150° C.;

an oxide coating covering at least part of a surface of the shaped article;

a wire wound around the shaped article; and terminal electrodes to which ends of the wire are connected, wherein the binder resin is an epoxy-containing resin, the epoxy-containing resin containing at least one selected from the group consisting of a bisphenol-A epoxy resin, a bisphenol-F epoxy resin, an epoxy polysiloxane, an alicyclic epoxy resin, and a tetrafunctional naphthalene-based epoxy resin, and the oxide coating comprises a metal oxide with an organic chain chemically or covalently bonded thereto.

2. The wire coil component according to claim 1, wherein the terminal electrodes include an oxygen-compatible metal layer as a base layer formed on a surface of the oxide coating.

3. The wire coil component according to claim 1, further comprising a coating resin that seals a portion of the wire wound around the shaped article.

4. The wire coil component according to claim 3, wherein the terminal electrodes include an oxygen-compatible metal layer as a base layer formed on a surface of the oxide coating.

5. The wire coil component according to claim 3, wherein the coating resin has a thermal expansion coefficient of from about 12 ppm/K to about 16 ppm/K, from −55° C. to 150° C.

6. The wire coil component according to claim 5, wherein the coating resin is made of the same material as the magnetic resin.

7. The wire coil component according to claim 5, wherein:

the shaped article has a spindle section, around which the wire is wound, and a pair of flanges at ends of the spindle section; and when, in a cross-section of the shaped article and the coating resin extending along an axis of the spindle section, a first region is defined as a region enclosed by a line that connects ends of the flanges and by a surface of the shaped article, and a second region as a region whose perimeter includes the line and a surface of the coating resin, a percentage by area of the second region to the first region is equal to or larger than about 5%.

8. The wire coil component according to claim 3, wherein the coating resin is made of the same material as the magnetic resin.

9. The wire coil component according to claim 8, wherein:

the shaped article has a spindle section, around which the wire is wound, and a pair of flanges at ends of the spindle section; and when, in a cross-section of the shaped article and the coating resin extending along an axis of the spindle section, a first region is defined as a region enclosed by a line that connects ends of the flanges and by a surface of the shaped article, and a second region as a region whose perimeter includes the line and a surface of the coating resin, a percentage by area of the second region to the first region is equal to or larger than about 5%.

10. The wire coil component according to claim 3, wherein:

the shaped article has a spindle section, around which the wire is wound, and a pair of flanges at ends of the spindle section; and when, in a cross-section of the shaped article and the coating resin extending along an axis of the spindle section, a first region is defined as a region enclosed by a line that connects ends of the flanges and by a surface of the shaped article, and a second region as a region whose perimeter includes the line and a surface of the coating resin, a percentage by area of the second region to the first region is equal to or larger than about 5%.

11. The wire coil component according to claim 10, wherein the terminal electrodes are on one of the pair of flanges.

12. A method for producing the wire coil component according to claim 1, the method comprising:

mixing the binder resin and the magnetic metal powder to form a granulated powder, forming the shaped article from the granulated powder, and winding the wire around the shaped article.

13. The wire coil component according to claim 1, wherein the shaped article has a thermal expansion coefficient of from 12 ppm/K to 14.4 ppm/K.

14. A wire coil component comprising:

a shaped article formed from a magnetic resin that contains a binder resin and a magnetic metal powder and having a thermal expansion coefficient of from 12 ppm/K to 16 ppm/K, from −55° C. to 150° C.;

an oxide coating covering at least part of a surface of the shaped article;

a wire wound around the shaped article; and terminal electrodes to which ends of the wire are connected, wherein a percentage by weight of the binder resin in the shaped article is from 1 wt % to 4 wt %, and the oxide coating comprises a metal oxide with an organic chain chemically or covalently bonded thereto.

15. The wire coil component according to claim 14, further comprising a coating resin that seals a portion of the wire wound around the shaped article.

16. The wire coil component according to claim 14, wherein the terminal electrodes include an oxygen-compatible metal layer as a base layer formed on a surface of the oxide coating.

17. The wire coil component according to claim 14, wherein a percentage by weight of the binder resin in the shaped article is from 1 wt % to 1.5 wt %, and the shaped article has a thermal expansion coefficient of from 12 ppm/K to 14.4 ppm/K.

* * * * *